(12) United States Patent
Geiselhart et al.

(10) Patent No.: US 12,003,709 B1
(45) Date of Patent: Jun. 4, 2024

(54) VISUAL DATA TRANSMISSION BY AN AIR-GAPPED SYSTEM

(71) Applicant: INTERNATIONAL BUSINESS MACHINES CORPORATION, Armonk, NY (US)

(72) Inventors: Reinhold Geiselhart, Rottenburg-Ergenzingen (DE); Rene Blath, Weil im Schoenbuch (DE); Frank Kuster, Grobbottwar (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/988,591

(22) Filed: Nov. 16, 2022

(51) Int. Cl.
*H04N 19/00* (2014.01)
*H04N 19/112* (2014.01)
*H04N 19/115* (2014.01)

(52) U.S. Cl.
CPC ......... *H04N 19/115* (2014.11); *H04N 19/112* (2014.11)

(58) Field of Classification Search
CPC ............................ H04N 19/115; H04N 19/112
See application file for complete search history.

(56) References Cited

U.S. PATENT DOCUMENTS

| | | | | |
|---|---|---|---|---|
| 4,907,296 A * | 3/1990 | Blecha | .................... | A42B 3/042 2/6.2 |
| 5,856,811 A * | 1/1999 | Shih | .................... | G02B 27/0176 345/8 |
| 9,716,855 B2 * | 7/2017 | Gehring | .............. | G06F 16/9554 |
| 10,033,797 B1 * | 7/2018 | Alger | ....................... | H04L 67/02 |
| 10,901,829 B2 * | 1/2021 | Mattia | ................. | G06F 11/3055 |
| 11,032,131 B1 * | 6/2021 | Franceschetti | ........ | G06F 21/606 |
| 11,206,140 B2 * | 12/2021 | Hennessy | ............. | H04L 9/3263 |
| 11,240,369 B2 * | 2/2022 | Hennessy | ............... | G06F 21/74 |
| 2014/0146153 A1 * | 5/2014 | Birnkrant | ................. | H04N 7/18 348/77 |
| 2015/0009550 A1 * | 1/2015 | Misago | ................. | H04N 9/3155 359/205.1 |
| 2016/0225192 A1 * | 8/2016 | Jones | ..................... | A61B 34/20 |
| 2016/0308680 A1 * | 10/2016 | Lindteigen | ............... | H04L 9/30 |
| 2017/0007351 A1 * | 1/2017 | Yu | ...................... | G02B 27/0172 |
| 2017/0099479 A1 * | 4/2017 | Browd | ................... | A61B 34/20 |
| 2017/0181802 A1 * | 6/2017 | Sachs | ..................... | A61B 90/06 |
| 2017/0322410 A1 * | 11/2017 | Watson | ................. | G06T 19/006 |

(Continued)

OTHER PUBLICATIONS

Hacker https://thehackernews.com/2017/09/airgap-network-malware-hacking.html, Sep. 20, 2017.*

(Continued)

*Primary Examiner* — Frank F Huang
(74) *Attorney, Agent, or Firm* — Kelli D. Morin

(57) ABSTRACT

Visual data transmission by an air-gapped system, including: transmitting, by an air-gapped system comprising at least one first computing device, a visual encoding of data via a display; detecting, during capture of the visual encoding of the data by a second computing device via a camera, an error; generating, by the second computing device in response to the error, and alert; and retransmitting, in response to a user input to the air-gapped system, at least a portion of the visual encoding of the data via the display.

20 Claims, 8 Drawing Sheets

(56) References Cited

U.S. PATENT DOCUMENTS

| | | | | |
|---|---|---|---|---|
| 2018/0012413 | A1* | 1/2018 | Jones | G06F 3/0346 |
| 2018/0203755 | A1* | 7/2018 | Das | G06F 11/0709 |
| 2018/0232391 | A1* | 8/2018 | Goldberg | G06F 16/1748 |
| 2018/0351780 | A1* | 12/2018 | Atanasov | H04L 69/40 |
| 2019/0052638 | A1* | 2/2019 | Agarwal | H04L 63/08 |
| 2019/0254754 | A1* | 8/2019 | Johnson | G16H 20/40 |
| 2020/0117025 | A1* | 4/2020 | Sauer | G02C 9/00 |
| 2020/0330179 | A1* | 10/2020 | Ton | G02C 7/088 |
| 2021/0067764 | A1* | 3/2021 | Shau | A61B 90/361 |
| 2021/0224212 | A1 | 7/2021 | Gancarz | |

OTHER PUBLICATIONS

IBM, Using the call-home function, BIM Db2 Analytics Accelerator for z/OS, Version 7.5.9, URL: https://www.ibm.com/docs/en/daafz/7.5?topic=basics-using-call-home-function, last updated Aug. 9, 2022, 1 page.

Wikipedia, Optical Character Recognition (Unicode block), URL: https://en.wikipedia.org/wiki/Optical_Character_Recognition_(Unicode_block), last edited Jun. 18, 2022, 3 pages.

Wikipedia, Optical character recognition, URL: https://en.wikipedia.org/wiki/Optical_character_recognition, last edited Aug. 15, 2022, 12 pages.

\* cited by examiner

VISUAL DATA TRANSMISSION BY AN AIR-GAPPED SYSTEM

BACKGROUND

Field of the Invention

The field of the invention is data processing, or, more specifically, methods, apparatus, and products for visual data transmission by an air-gapped system.

Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Air-gapped systems may be used to protect systems from malware and prevent access to sensitive information. In an air-gapped system, no computing devices in the system, as well as no other computers that may be used to administer or maintain the system, are allowed to have a direct internet connection. As a result of the isolation of these systems, some aspects of maintenance or troubleshooting may be difficult. For example, trace files or other diagnostic files generated by the air-gapped system cannot be directly sent to manufacturers or other service personnel due to the lack of a direct internet connection.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

SUMMARY

Visual data transmission by an air-gapped system may include: transmitting, by an air-gapped system comprising at least one first computing device, a visual encoding of data via a display; detecting, during capture of the visual encoding of the data by a second computing device via a camera, an error generating, by the second computing device in response to the error, and alert; and retransmitting, in response to a user input to the air-gapped system, at least a portion of the visual encoding of the data via the display.

DETAILED DESCRIPTION

Figure 1:
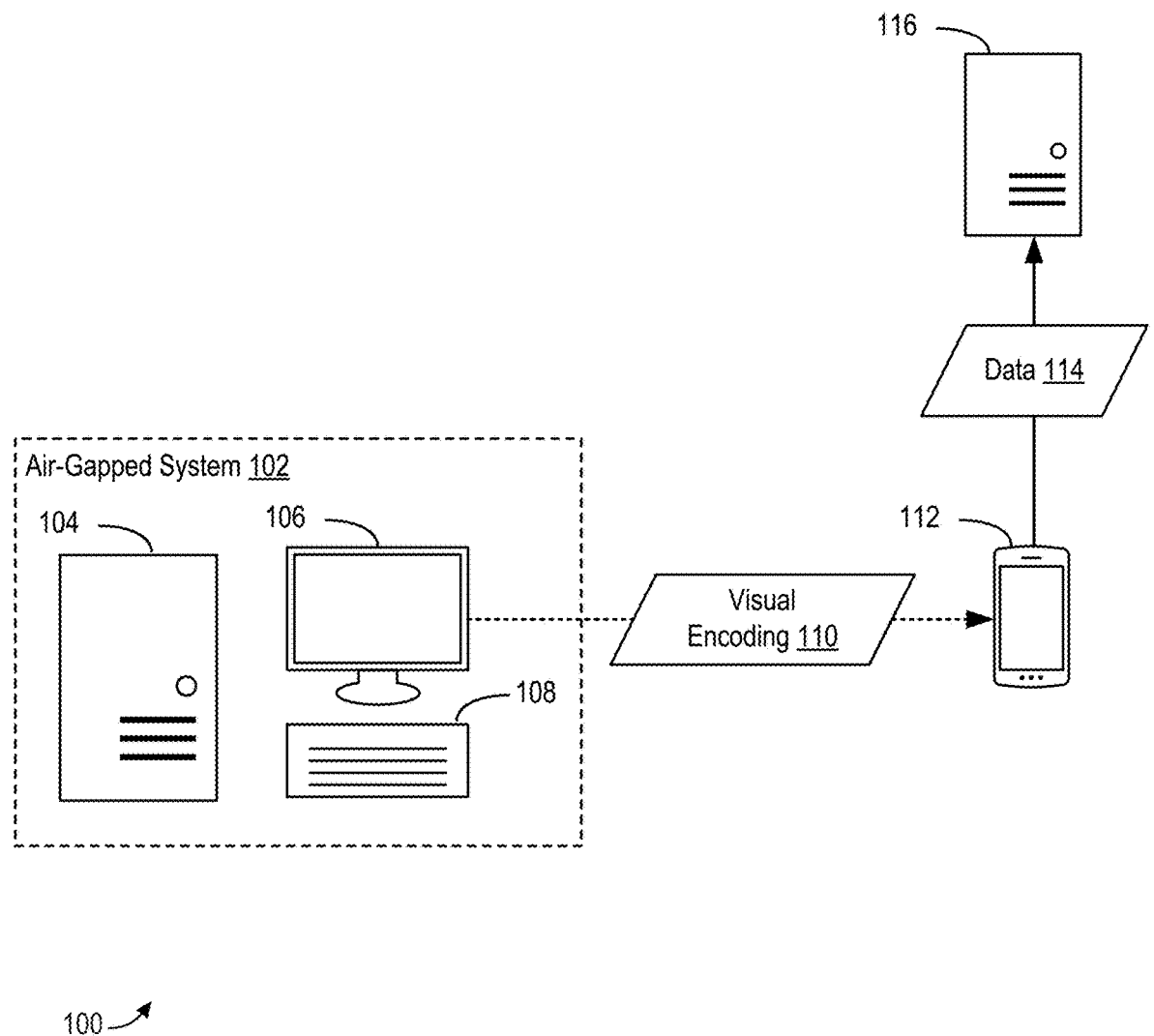
FIG. 1 shows a block diagram of an example system for visual data transmission by an air-gapped system according to some embodiments of the present disclosure.

Visual data transmission by an air-gapped system according to some embodiments of the present disclosure may be implemented using an example system 100 as set forth in FIG. 1. The example system 100 includes an air-gapped system 102. The air-gapped system 102 includes one or more computing devices 104. The one or more computing devices 104 may include a variety of computing devices 104 as can be appreciated by one skilled in the art, including desktop computers, servers, mainframes, laptop computers, mobile devices, and the like. The one or more computing devices 104 form an air-gapped system 102 in that the one or more computing devices 104 lack a direct internet connection. In other words, the one or more computing devices 104 lack any direct connection to an external network, but may be coupled via a local wired network, local wireless network, and the like.

The air-gapped system 102 also includes a display 106 and a keyboard 108. The display 106 may include, for example, a dedicated display 106 such as monitor. In some embodiments, the display 106 and the keyboard 108 may be combined into a single device, such as a touch-screen display 106 capable of user input. The air-gapped system 102 may also include other user input devices in addition to or instead of the keyboard 108, such as a mouse, a tablet, or other user input devices as can be appreciated. In some embodiments, the display 106 and the keyboard 108 may be included in a terminal or other device used to interact with the computing devices 104 of the air-gapped system.

During operation of the air-gapped system 102, some data may need to be transmitted to another computing device. Due to the isolation of the air-gapped system 102, this data may not be directly transmitted to another device using the interne or another external network. For example, during operation of the air-gapped system 102, a trace file or other diagnostic data may be generated in response to an error or in order to troubleshoot or configure the air-gapped system 102.

Accordingly, in order to transmit this data without compromising the network isolation of the air-gapped system 102, the computing devices 104 of the air-gapped system 102 may generate a visual encoding 110 of the data. A visual encoding 110 of data includes data encoded into visually a perceptible or transmittable encoding. For example, in some embodiments, a visual encoding 110 of the data may include a text encoding of the data, whereby the data is encoded into text characters or strings. In such embodiments, the data may be encoded into multiple pages, screens, or lines of strings or characters. In some embodiments, a visual encoding 110 of the data may include a quick response (QR) code encoding of the data. In such embodiments, the data may be encoded into multiple QR codes each corresponding to some portion of the data. The visual encoding 110 of the data may also include other visual encodings as can be appreciated.

The computing devices 104 of the air-gapped system 102 then transmit the visual encoding 110 of the data by displaying the visual encoding 110 of the data via the display 106. For example, where the visual encoding 110 of the data includes a text encoding, the visual encoding 110 of the data may be transmitted by displaying the text encoding across multiple screens or frames of text, by displaying the text encoding line-by-line, or according to other approaches as can be appreciated. In some embodiments, some portions of the displayed text may include one or more special characters delineating or defining portions of the visual encoding 110 of data. For example, one or more special characters may define a beginning and/or end of the visual encoding 110 of the data (e.g., indicating a start of a first portion of the text encoding and/or an end of a last portion of the text encoding). As another example, one or more special characters may define a beginning and/or ending of a currently displayed portion of the visual encoding 110 of the data. Thus, the special characters may be used to distinguish text for the visual encoding 110 of the data from other currently displayed text, such as when the visual encoding 110 of the data is being displayed in a particular user interface frame, terminal, or window. Such special characters and/or the visual encoding 110 of the data may be encoded and displayed using a particular font or typeface configured or optimized for optical character recognition (OCR), such as the OCR font, the OCR-A font, the magnetic ink character recognition (MICR) typeface, and the like. As another example, where the visual encoding 110 of the data includes a QR code encoding, the visual encoding 110 of the data may be transmitted by displaying multiple screens or frames of QR codes each encoding some portion of data.

The visual encoding 110 of the data is then captured using a mobile device 112. The mobile device 112 may include, for example, a smart phone, a tablet device, a laptop, or other mobile computing device as can be appreciated. The mobile device 112 includes a camera via which the visual encoding 110 of the data is captured. Although the example system 100 shows a mobile device 112, one skilled in the art will appreciate that any computing device including or operatively coupled to a camera may also be used according to the approaches set forth herein. For example, the mobile device 112 may use the camera to apply an OCR function to a captured frame to extract or generate a portion of the data encoded using the visual encoding 110 of the data. As another example, the mobile device 112 may use the camera to capture or generate some portion of data encoded using a particular QR code. As is set forth above, the visual encoding 110 of the data may be transmitted by displaying portions of the visual encoding 110 of the data via the display 106 across multiple frames, across multiple lines (e.g., across multiple line refreshes or by scrolling), or otherwise transmitted over time via the display 106. Accordingly, a rate at which the visual encoding 110 of the data is transmitted may be customized based on a variety of design or engineering considerations, including a capture rate, frequency, or resolution of the camera of the mobile device 112, according to a display frequency or resolution of the display 106, according to a targeted or threshold data transmission rate, or according to other criteria.

After completing capture of the visual encoding 110 of the data, the mobile device 112 generates an instance of the data, shown as data 114. The data 114 may be stored in long-term (e.g., non-volatile) storage of the mobile device 112, stored in short-term (e.g., volatile) memory, or both. The data 114 is then transmitted to a remote computing device 116. The data 114 may be transmitted using an external network connection such as an internet connection. As the mobile device 112 is not connected to the air-gapped system 102 using a computer network, the mobile device 112 may itself use an internet connection without compromising the network isolation of the air-gapped system 102. The remote computing device 116 may correspond to entities such as a manufacturer or service personnel associated with the air-gapped system 102. Thus, data generated by the air-gapped system 102 such as trace files or other diagnostic data may be transmitted to the appropriate entity to facilitate servicing of the air-gapped system 102. For example, a manufacturer may be able to provide service recommendations to a user that has physical access to the air-gapped system 102 using the received trace file or diagnostic data.

Existing approaches for visual transmission of data as described above are susceptible to errors in data transmission. For example, where there is an error in displaying or capturing some portion of the visual encoding 110, the mobile device 112 is unable to indicate to the air-gapped system 102 that an error has occurred due to the lack of a direct computer network connection between the two. Accordingly, in the event of an error, transmission of the visual encoding 110 of the data must be restarted from the beginning. This may result in significant amounts of wasted time, particularly as the size of the visually encoded data becomes larger.

In contrast, visual data transmission by an air-gapped system allows for retransmission of portions of the visual encoding 110 of the data, minimizing the amount of time required to recover from an error in transmitting the visual encoding 110 of the data. In response to detecting an error (e.g., in response to detecting an error in a portion of the visual encoding 110 of the data as displayed or in response to detecting an error in capturing the visual encoding 110 of the data), the mobile device 112 generates an alert. The alert is a user-perceptible notification that an error has occurred. The alert may include, for example, an audio alert (e.g., playing some tone or sound by the mobile device), a haptic alert (e.g., vibrating the mobile device 112), a visual alert such as a flashing light or light-emitting diode (LED), or another alert as can be appreciated. In response to the alert, a user may provide an input to an input device of the air-gapped system 102. For example, the user may press a key on the keyboard 108, click a mouse, tap a touch-screen display, or otherwise interact with some input device.

In response to the user input, the air-gapped system 102 then retransmits some portion of the visual encoding 110 of the data. In some embodiments, the visual encoding 110 of the data is time-coded according to times at which portions of the visual encoding 110 are displayed for transmission. For example, each portion of text or QR code may have a time code or time stamp associated with it when it is presented for display. Accordingly, the portion of the visual encoding 110 of the data selected for retransmission may be selected by applying some offset (e.g., a time offset) relative to a time at which the user input was received or detected. For example, in response to the user input, transmission of the visual encoding 110 may be rewound or replayed from some time stamp a predefined amount of time before the time at which the user input was received (e.g.,, two seconds, four seconds, and the like). The time offset used for rewinding or replaying transmission of the visual encoding 110 of the data is hereinafter referred to as a "blocksize." Although the blocksize is described with respect to a time offset, the blocksize may also be calculated according to other approaches, including a number of frames, a particular amount of data, and the like.

Where the retransmitted portion of the visual encoding 110 of the data includes the portion corresponding to the detected error, and where the retransmitted portion of the visual encoding 110 of the data is received without another error, the mobile device 112 will refrain from generating another alert until another error is detected, if ever. Thus, the air-gapped system 102 will continue to transmit the visual encoding 110 of the data until transmission is complete or another user input is received.

Where the retransmitted portion of the visual encoding 110 of the data does not include the portion of the data corresponding to the detected error, meaning retransmission started from a point after the error occurred, the mobile device 112 will generate another alert. For example, the mobile device 112 may compare currently captured portions of data (e.g., during retransmission) to previously captured portions of data to determine which portions of the visual encoding 110 of the data are being retransmitted. Where the currently captured portions of data correspond to data after the detected error, the mobile device 112 will then generate another alert, thereby prompting the user to provide another user input to the air-gapped system 102.

In response to the other user input, the air-gapped system 102 will then rewind or replay the visual encoding 110 of the data from a greater offset relative to when the first user input was received. For example, where the first user input caused retransmission from two seconds prior to where the first user input was received (e.g., a single block of a two-second blocksize), the second user input may cause retransmission from four seconds prior to where the first user input was received (e.g., two blocks of the two-second blocksize).

In some embodiments, the air-gapped system 102 must determine whether a particular user input is being used to indicate that retransmission should be rewound further (e.g., that retransmission should begin from a further point relative to a previously received user input) or corresponds to a newly detected error, meaning that retransmission should begin from some point relative to the particular user input. For example, assume that a first user input is received at time $T_0$ corresponding to transmission of data M. This causes retransmission from time $T_0$-BLOCKSIZE. Where another user input is received prior to transmitting a blocksize of data after transmitting data M (e.g., transmitting two seconds of data beyond the point where the first user input was received), retransmission will then begin from time $T_0$-2*BLOCKSIZE. Where another user input is received after transmitting a blocksize past data M (e.g., at $T_1$), it is assumed that this other user input corresponds to a new error, causing retransmission to begin from time $T_1$-BLOCKSIZE. One skilled in the art will appreciate that the particular thresholds used to determine points from which data retransmission will begin may be configured according to a variety of design configurations. Moreover, in some embodiments, such thresholds may be dynamically calculated instead of being predefined. For example, such thresholds may be reduced over time or as multiple user inputs for a particular error are received. This allows for such thresholds to be modified over time as a user may be more aware and have a reduced reaction time for detected alerts.

In some embodiments, the air-gapped system 102 may determine that retransmission should begin from the beginning of the visual encoding 110 of the data. For example, in response to multiple user inputs, retransmission of the visual encoding 110 of the data may be rewound back to the beginning of the visual encoding 110 of the data. In such an embodiment, the air-gapped system 102 may instead present (e.g., via the display) one or more recommendations. Such recommendations may include, for example, suggestions for optimizing capture of the visual encoding 110, such as changes to lighting, camera positioning, camera stability, and the like. Such recommendations may also include a suggestion to attempt transmission of the visual encoding 110 of the data at a different time. In some embodiments, presenting the recommendation may be performed instead of retransmitting any portion of the visual encoding 110 of the data.

Figure 2:
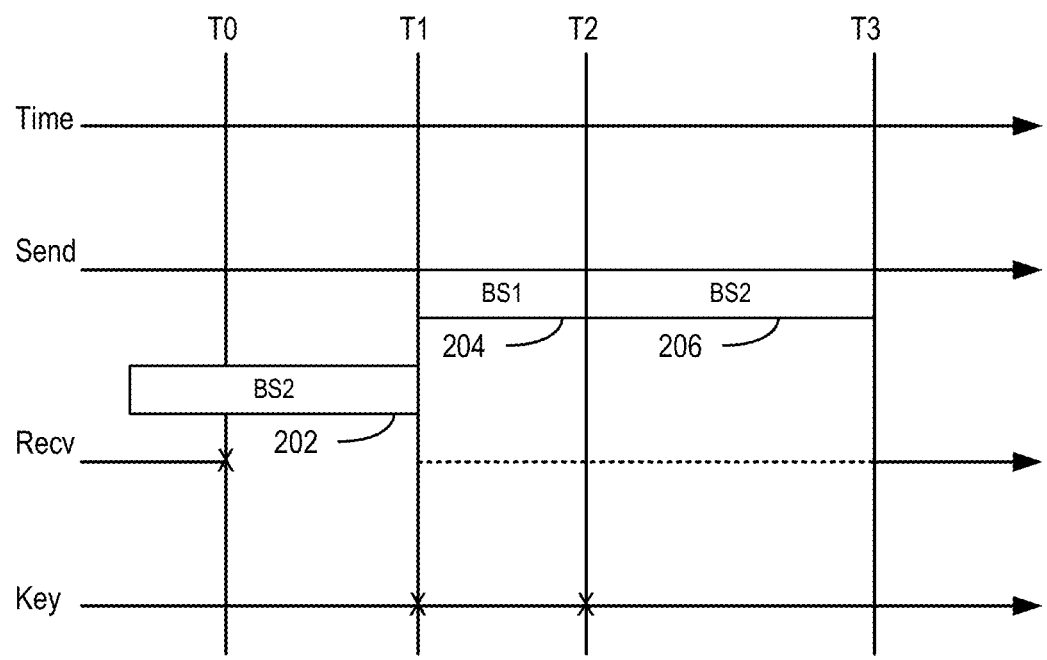
FIG. 2 shows an example timeline for visual data transmission by an air-gapped system according to some embodiments of the present disclosure.

FIG. 2 shows an illustrative timeline for visual data transmission by an air-gapped system according to some embodiments of the present disclosure. Assume that, during transmission of a visual encoding 110 of data, an error is detected by a mobile device 112 at $T_0$. An alert is generated, causing a user to provide input to some input device of an air-gapped system 102 at $T_1$. Here, block 202 provides a visual reference that the error occurred at To within two blocksizes (e.g., 2*BLOCKSIZE) prior to receiving the user input at $T_1$.

In response to the user input at $T_1$, retransmission is rewound by a single blocksize, shown by block 204. The mobile device 112 will detect that this did not rewind retransmission far enough, causing another alert to be generated and another user input to be provided at $T_2$. This will then cause retransmission to be rewound to 2*BLOCKSIZE, shown by block 206, before when the first user input was received at $T_1$. As this retransmission will include the portion of the data corresponding to the error, transmission of previously untransmitted data will begin at $T_3$.

Figure 3:
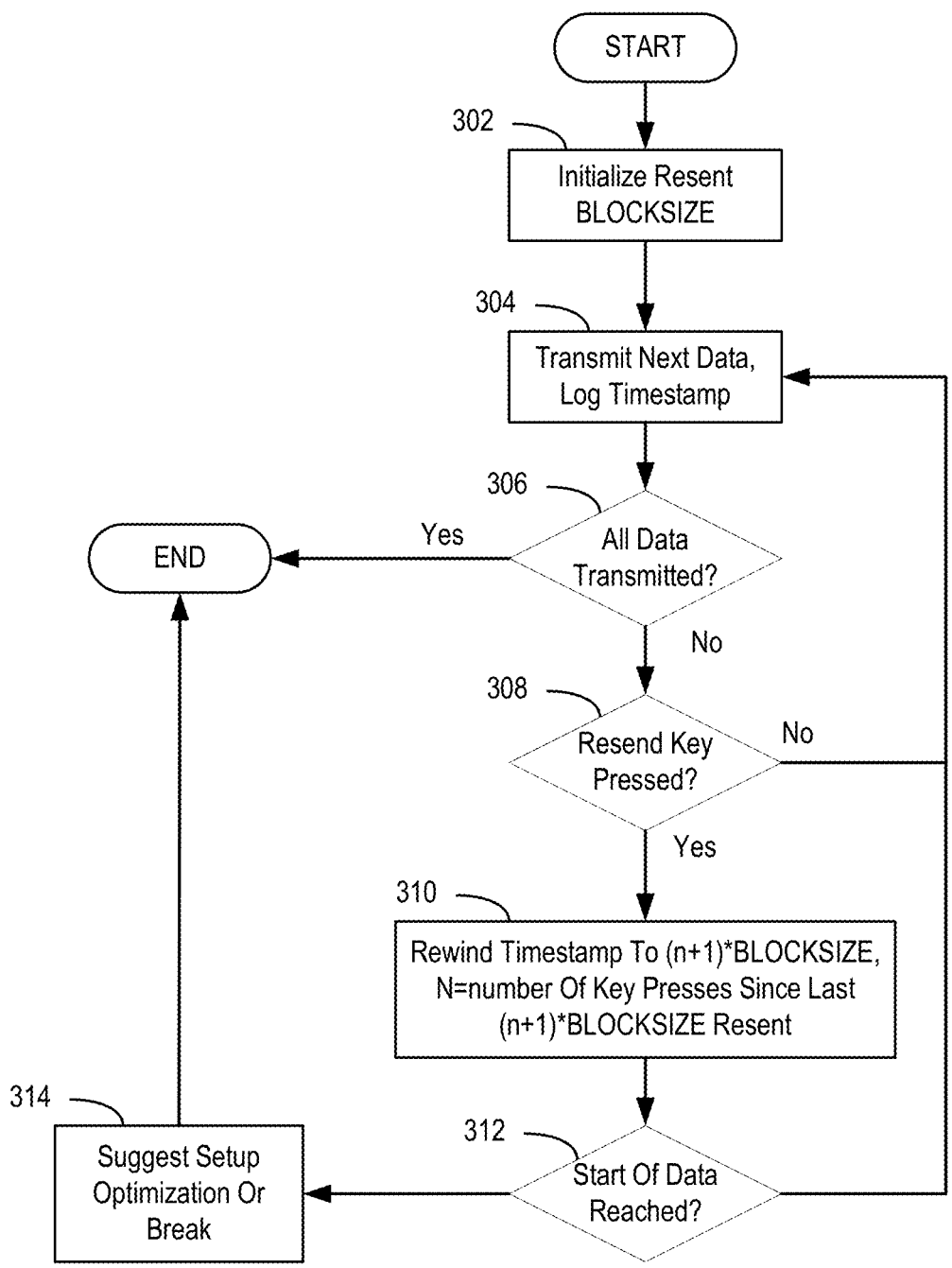
FIG. 3 shows an example flow diagram for visual data transmission by an air-gapped system according to some embodiments of the present disclosure.

FIG. 3 sets forth a flow diagram for visual data transmission by an air-gapped system according to some embodiments of the present disclosure. The flow diagram of FIG. 3 describes visual data transmission by an air-gapped system from the perspective of the air-gapped system 102. Beginning at block 302, the resent BLOCKSIZE is initialized. As described above, BLOCKSIZE describes an amount of data by which the transmission of a visual encoding 110 of data is rewound or replayed in response to a user input (e.g., to an input device such as a keyboard). The BLOCKSIZE may be initialized to some amount of time (e.g., two seconds, four seconds), some amount of data, some amount of frames, or defined according to another approach.

At block 304, the next portion of the data is transmitted. In other words, a next portion in a sequence of portions of a visual encoding 110 of data is transmitted by displaying the next portion of the data via a display 106. Also at block 304, a timestamp for the transmitted portion of data is recorded. At block 306, it is determined if all potions of the visual encoding 110 of data have been transmitted (e.g., displayed without error). If so, the process ends. If not, the process advances to block 308 where it is determined if the resend key has been pressed. In other words, it is determined if a user input to the keyboard 108 indicating an error has been received (e.g., in response to an alert by the mobile device 112).

If the resend key was not pressed, the process returns to block 304 where a next portion of data is transmitted. Otherwise, if the resend key was pressed, the process advances to block 310. At block 310, a portion of the visual encoding 110 of data is selected to be retransmitted by rewinding the timestamp to (n+1)*BLOCKSIZE, where n=the number of resend key presses since the last (n+1)*BLOCKSIZE of data was resent. If, at block 312, it is determined that the start of the data has been reached (e.g., it has been determined that the transmission of data should be rewound to the beginning), the process advances to block 314 where it is suggested that some optimization be performed or for the user to take a break, after which the process will end. Otherwise, if the start of the data was not reached, the process returns to block 304 where the next data is transmitted and the timestamp logged. Here, the next portion of the data to transmit is defined by rewinding the timestamp as described in block 310.

Visual data transmission by an air-gapped system in accordance with the present application is generally implemented with computers, that is, with automated computing machinery. For further explanation, therefore, FIG. 4 sets forth a block diagram of computing machinery including an exemplary computer 400 configured for visual data transmission by an air-gapped system according to certain embodiments. The computer 400 of FIG. 4 includes at least one computer processor 402 or 'CPU' as well as random access memory 404 ('RAM') which is connected through a high speed memory bus 406 and bus adapter 408 to processor 402 and to other components of the computer 400.

Stored in RAM 404 is an operating system 410. Operating systems useful in computers configured for visual data transmission by an air-gapped system according to certain embodiments include UNIX™, Linux™, Microsoft Windows™, and others as will occur to those of skill in the art. The operating system 410 in the example of FIG. 4 is shown in RAM 404, but many components of such software typically are stored in non-volatile memory also, such as, for example, on data storage 412, such as a disk drive.

Figure 4:
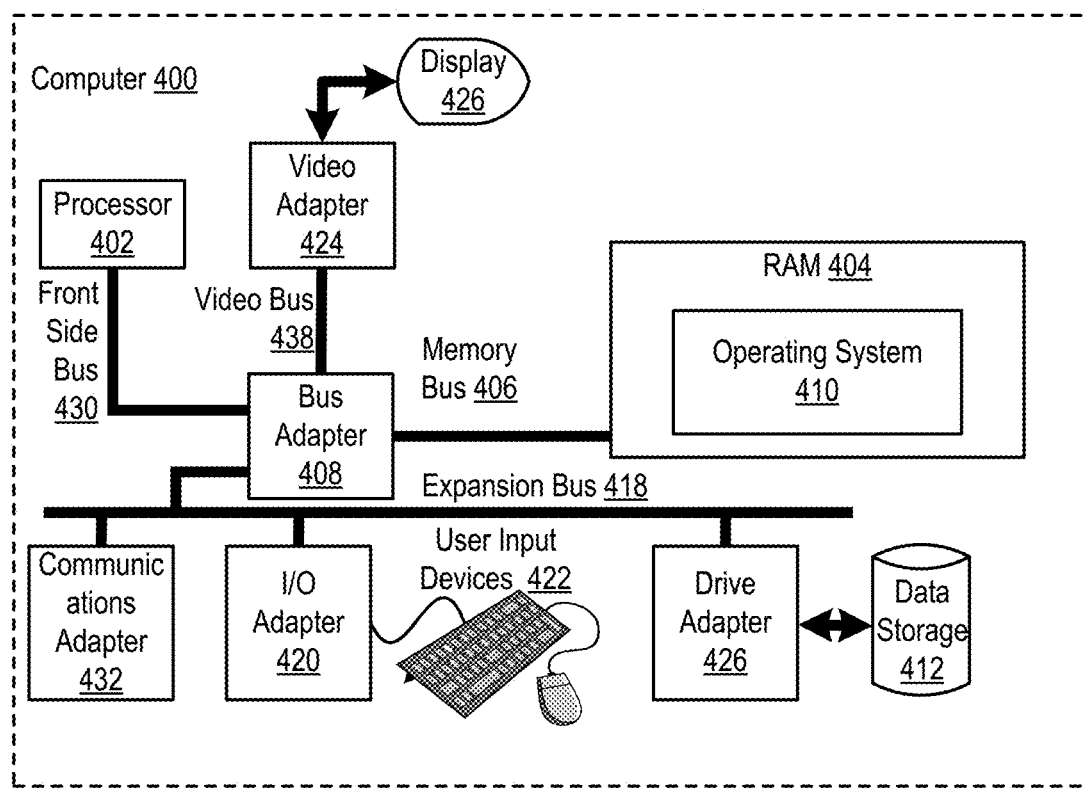
FIG. 4 shows an example computer for visual data transmission by an air-gapped system according to some embodiments of the present disclosure.

The computer 400 of FIG. 4 includes disk drive adapter 416 coupled through expansion bus 418 and bus adapter 408 to processor 402 and other components of the computer 400. Disk drive adapter 416 connects non-volatile data storage to the computer 400 in the form of data storage 412. Disk drive adapters useful in computers configured for visual data transmission by an air-gapped system according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 400 of FIG. 4 includes one or more input/output ('I/O') adapters 420. I/O adapters implement user-oriented input/output through, for example, software drivers and computer hardware for controlling output to display devices such as computer display screens, as well as user input from user input devices 422 such as keyboards and mice. The example computer 400 of FIG. 4 includes a video adapter 424, which is an example of an I/O adapter specially designed for graphic output to a display device 426 such as a display screen or computer monitor. Video adapter 424 is connected to processor 402 through a high speed video bus 428, bus adapter 408, and the front side bus 430, which is also a high speed bus.

The exemplary computer 400 of FIG. 4 includes a communications adapter 432 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for visual data transmission by an air-gapped system according to certain embodiments include modems for wired dial-up communications, Ethernet (IEEE 802.3) adapters for wired data communications, and 802.11 adapters for wireless data communications.

Figure 5:
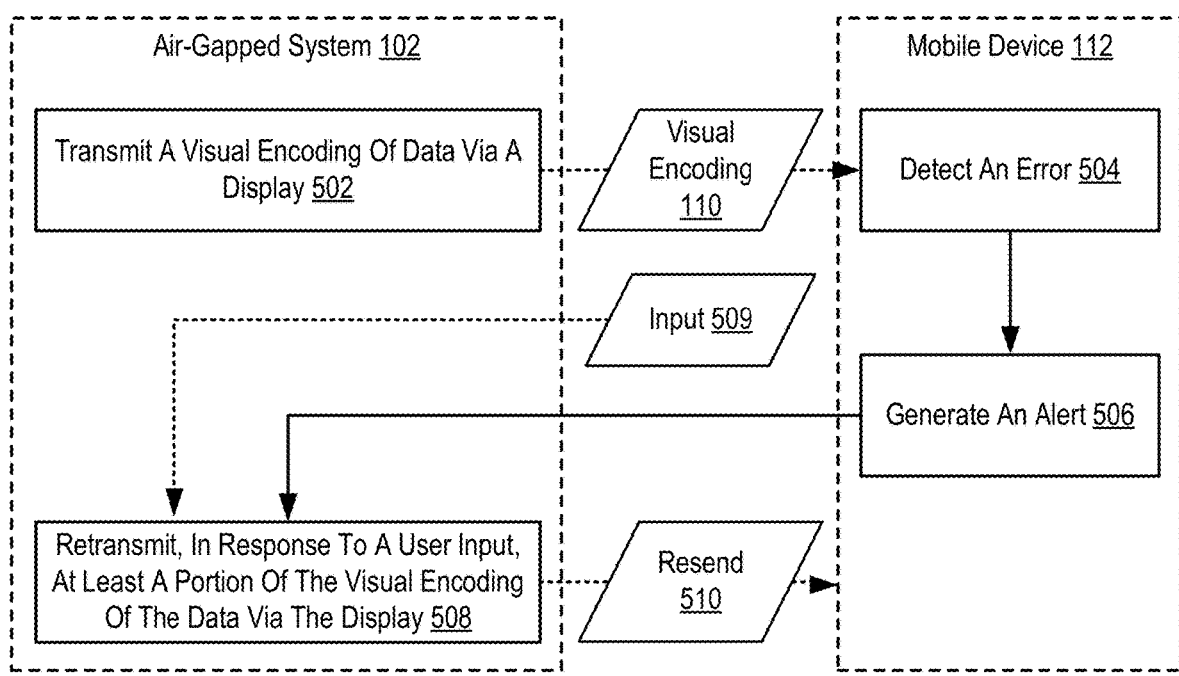
FIG. 5 shows a flowchart of an example method for visual data transmission by an air-gapped system according to some embodiments of the present disclosure.

For further explanation, FIG. 5 shows a flowchart of an example method for visual data transmission by an air-gapped system according to some embodiments of the present disclosure. The method of FIG. 5 may be performed, for example, by a system 100 including an air-gapped system 102 and a mobile device 112. The method of FIG. 5 includes transmitting 502 (e.g., by one or more computing devices 104 of an air-gapped system 102, a visual encoding 110 of data via a display 106. In other words, the visual encoding 110 of the data is transmitted 502 by displaying portions of the visual encoding 110 of the data via the display 106. The visual encoding 110 of the data may include, for example, a text encoding, a QR code encoding, or another visual encoding 110 of data as can be appreciated.

The method of FIG. 5 also includes detecting 502 (e.g., by a mobile device 112 during capture of the visual encoding 110 of the data) an error. The error may include, for example, an error associated with transmission of the visual encoding 110 of the data, an error in capturing the visual encoding 110 of the data, and the like. The method of FIG. 5 also includes generating 506 an alert. Generating 506 the alert may include generating a user-perceptible alert by the mobile device 112 in response to detecting 504 the error. Such an alert may include, for example, a sound alert, a haptic alert, and the like.

The method of FIG. 5 also includes retransmitting 508, in response to a user input 509, at least a portion of the visual encoding 110 of the data via a display. The at least a portion of the visual encoding 110 of the data is shown as resend 510. The user input 509 may include, for example, an input to an input device such as a keyboard 108. For example, the user input 509 may include a key press. The user input 509 may also include, for example, a click of a mouse, a touch screen input, and the like. Continuing with this example, the alert may cause a user of the mobile device 112 to provide the input to the input device. The user input 509 may cause transmission 502 of the visual encoding 110 of the data to stop. Transmission of the visual encoding 110 of the data then resumes from the at least a portion to be retransmitted.

In some embodiments, retransmitting 508 the at least a portion of the visual encoding of the data includes selecting a portion to be retransmitted. The portion may be selected by applying some offset (e.g., a blocksize offset) to a time at which the user input 509 was received. For example, where the user input 509 was received at a particular time and assuming a blocksize of two seconds, the visual encoding 110 of the data may be retransmitted from a point selected as being two seconds prior to when the input 509 was received. In such embodiments, timestamps or other log data may be maintained as the visual encoding 110 of the data is transmitted so that these timestamps may be used to effectively rewind or replay the transmission of the visual encoding 110 of the data.

Figure 6:
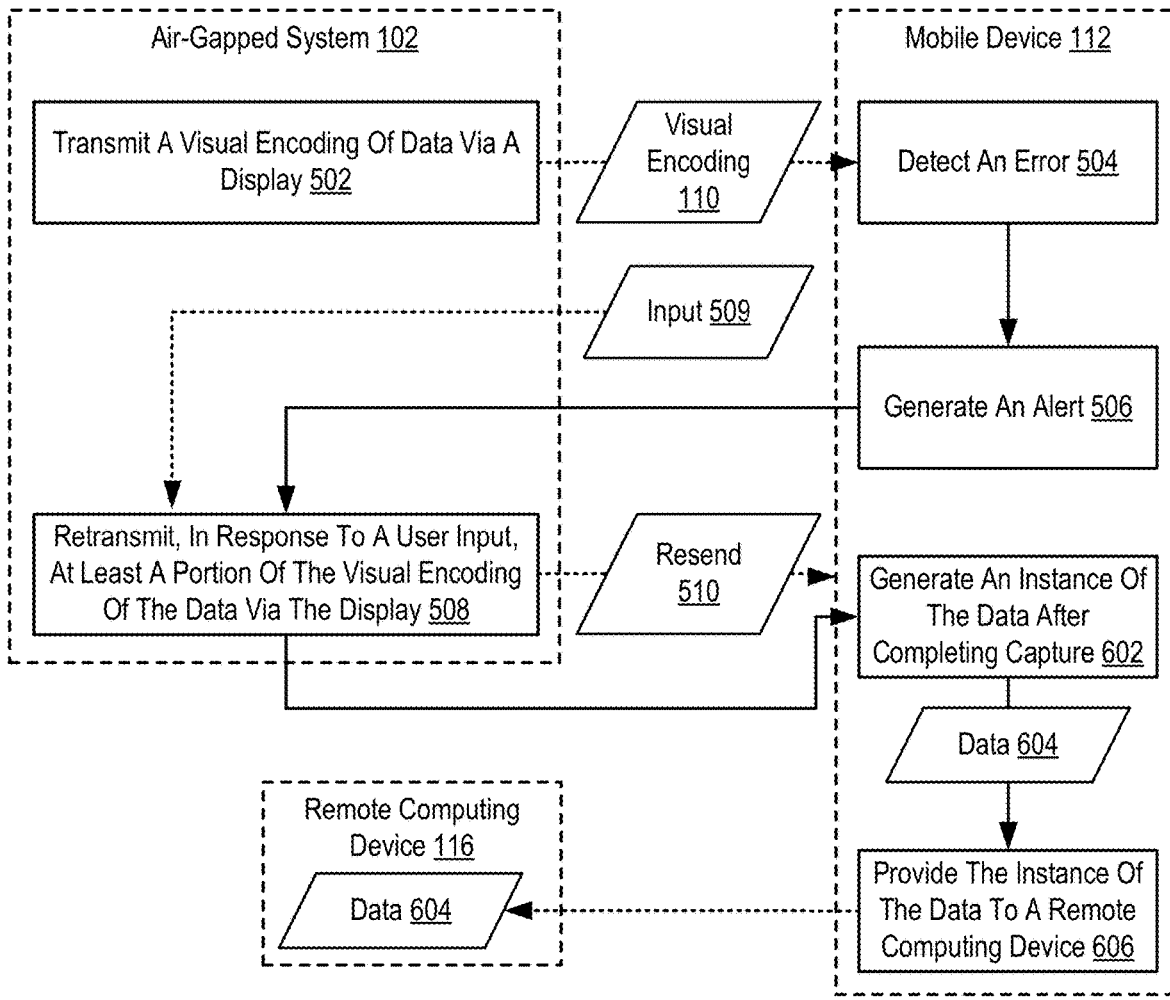
FIG. 6 shows a flowchart of an example method for visual data transmission by an air-gapped system according to some embodiments of the present disclosure.

For further explanation, FIG. 6 set forth a flowchart of another example method for visual data transmission by an air-gapped system according to some embodiments of the present disclosure. The method of FIG. 6 is similar to FIG. 5 in that the method of FIG. 6 includes transmitting 502 a visual encoding 110 of data via a display 106; detecting 504 an error; generating 506 an alert; and retransmitting 508, in response to a user input 509, at least a portion of the visual encoding 110 of the data via the display.

The method of FIG. 6 differs from FIG. 5 in that the method of FIG. 6 also includes generating 602 an instance of the data after completing capture (e.g., of the visual encoding 110 of the data). The instance of the data is shown as data 604. The data 604 may be generated by converting the captured visual encoding 110 of the data to a file or other data payload. The data 604 may be generated by applying decryption, decompression, or other functions an intermediate form of the data 604 generated from the visual encoding 110 of the data.

The method of FIG. 6 also includes providing 606 the instance of the data 604 to a remote computing device 116. Providing 606 the instance of the data 604 may include sending the data 604 according to a variety of approaches, including as an email attachment, as a file upload to a website or server, or according to other approaches as can be appreciated. The remote computing device 116 may correspond to a variety of entities, including manufacturers or support personnel associated with the air-gapped system 102, or other entities as can be appreciated.

Figure 7:
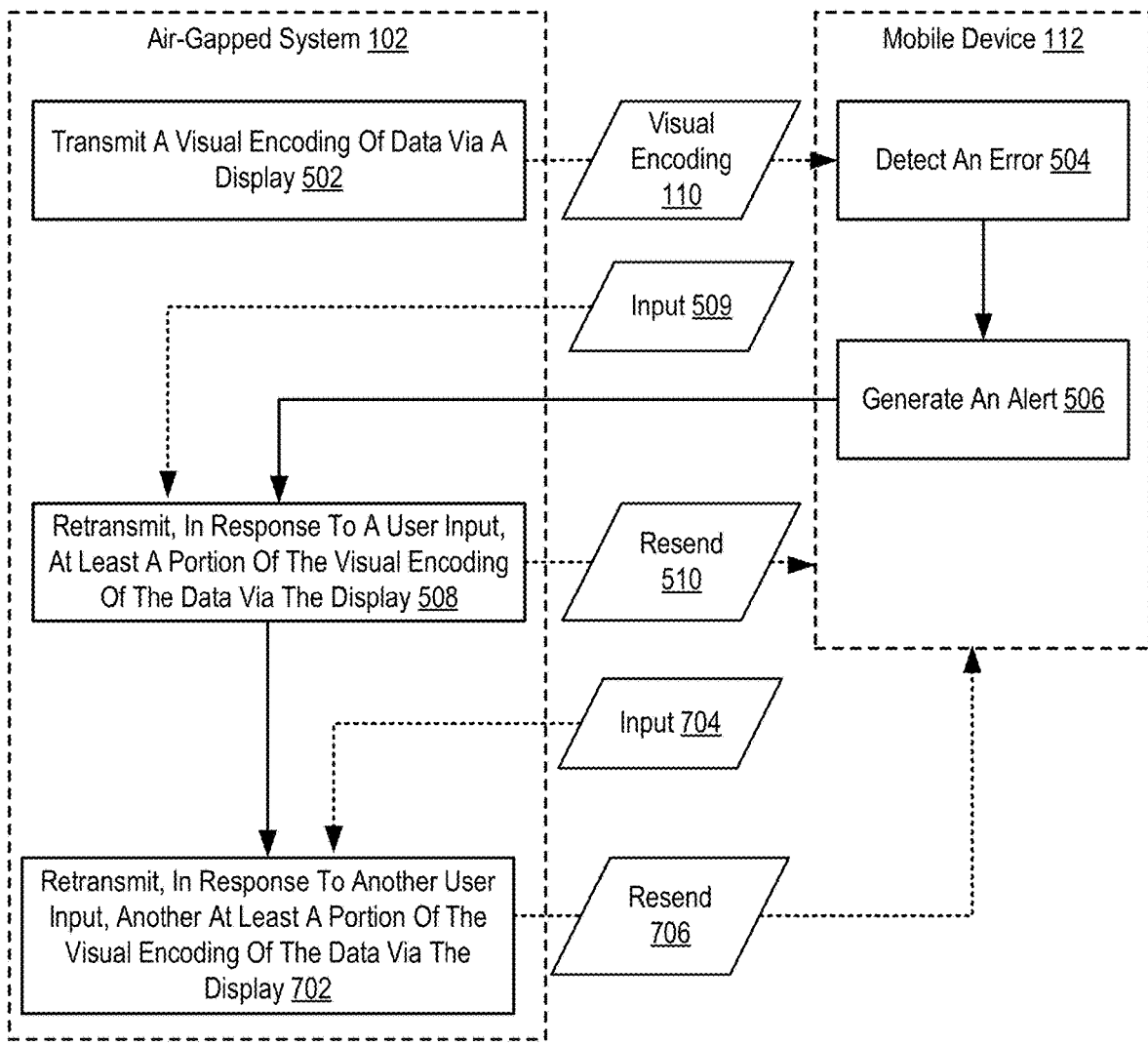
FIG. 7 shows a flowchart of an example method for visual data transmission by an air-gapped system according to some embodiments of the present disclosure.

For further explanation, FIG. 7 set forth a flowchart of another example method for visual data transmission by an air-gapped system according to some embodiments of the present disclosure. The method of FIG. 7 is similar to FIG. 5 in that the method of FIG. 7 includes transmitting 502 a visual encoding 110 of data via a display 106; detecting 504 an error; generating 506 an alert; and retransmitting 508, in response to a user input 509, at least a portion of the visual encoding 110 of the data via the display.

The method of FIG. 7 differs from FIG. 5 in that the method of FIG. 7 also includes retransmitting 702 (e.g., by the air-gapped system 102), in response to another user input 704, another at least a portion of the visual encoding 110 of the data via the display 106. The other user input 704 cause transmission 502 of the visual encoding of the data, or retransmission 508 of the at least a portion of the visual encoding 110 of the data, to end depending on when the other user input 704 was received. Transmission then resumes from the other at least a portion of the visual encoding 110 to be retransmitted 702. The other at least a portion of the visual encoding 110 of the data is shown as resend 706.

For example, assume that the at least a portion of the visual encoding 110 of the data to be retransmitted 508 was selected by applying a first offset (e.g., a blocksize offset) to a time at which the user input 509 was received. The other at least a portion of the visual encoding 110 to be retransmitted 702 may then be selected by applying a second offset greater than the first offset to the time at which the user input 509 was received. For example, where the user input 509 caused transmission of the visual encoding 110 of the data to be rewound by two seconds from the time at which the user input 509 was received, the other user input may cause transmission of the visual encoding 110 of the data to be rewound to four seconds from the time at which the user input 509 was received.

Figure 8:
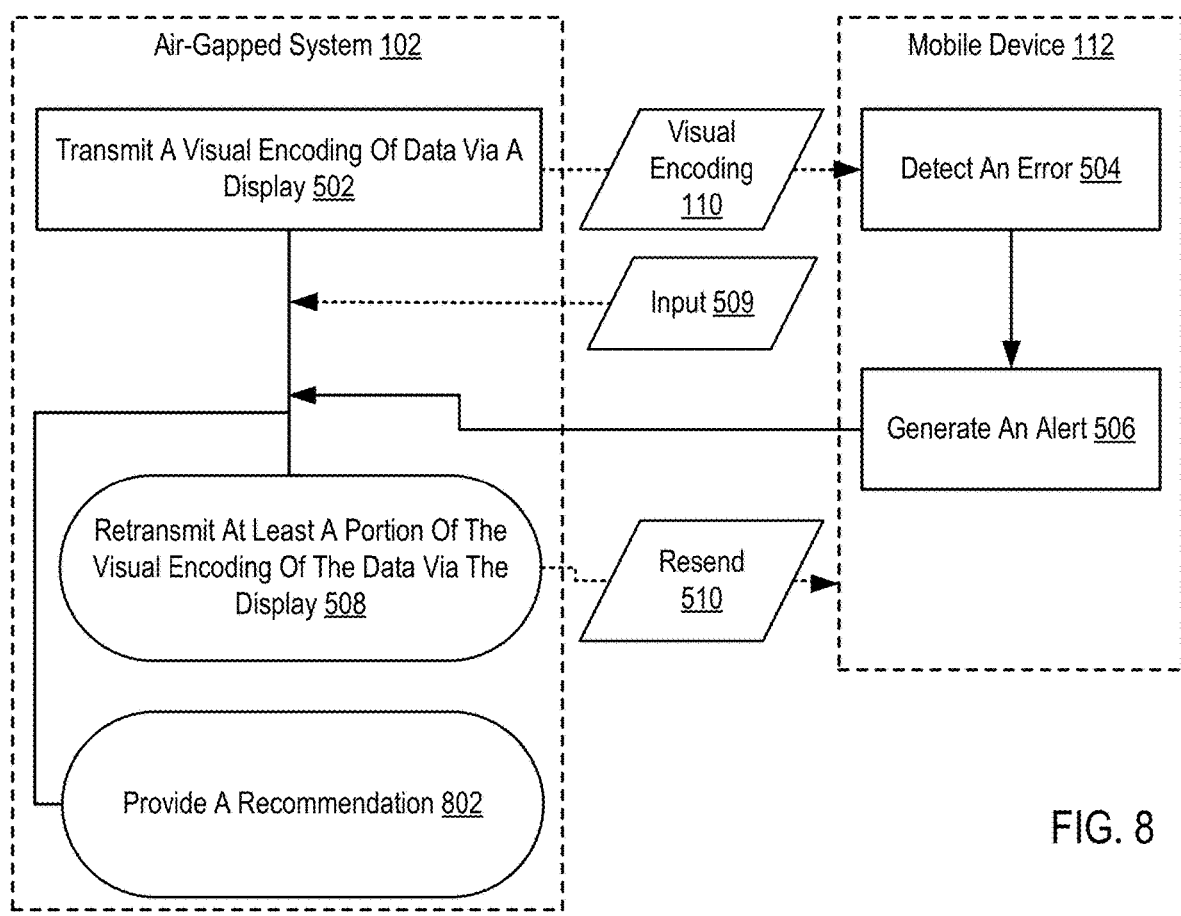
FIG. 8 shows a flowchart of an example method for visual data transmission by an air-gapped system according to some embodiments of the present disclosure.

For further explanation, FIG. 8 set forth a flowchart of another example method for visual data transmission by an air-gapped system according to some embodiments of the present disclosure. The method of FIG. 8 is similar to FIG. 5 in that the method of FIG. 7 includes transmitting 502 a visual encoding 110 of data via a display 106; detecting 504 an error; generating 506 an alert; and retransmitting 508, in response to a user input 509, at least a portion of the visual encoding 110 of the data via the display.

The method of FIG. 8 differs from FIG. 5 in that retransmitting 508 the at least a portion of the visual encoding 110 of the data may be optionally performed. Instead, in some embodiments, providing 802 a recommendation may be performed instead of retransmitting 508 the at least a portion of the visual encoding 110 of the data. For example, where it is determined that the at least a portion of the visual encoding 110 of the data would correspond to a beginning of the visual encoding (e.g., where it is determined that the beginning of the visual encoding 110 would be retransmitted), a recommendation may instead be provided 802.

The recommendation may be provided 802 as some output of the air-gapped system 102. For example, the recommendation may be presented via the display 106 or by another display or output device. The recommendation may include, for example, a suggestion to take break or otherwise wait some amount of time before attempting to retransmit the visual encoding 110 of the data. The recommendation may also include a suggestion to optimize or modify an environment for transmitting the visual encoding 110 of the data. The recommendation may also include a recommendation or other resources for calibrating transmission of the visual encoding 110 of the data.

In view of the explanations set forth above, readers will recognize that the benefits of visual data transmission by an air-gapped system according to embodiments of the present invention include improved performance of a computing system by allowing for retransmission of portions of a visual encoding of data in response to a detected error without necessarily restarting transmission from the beginning, saving time, computational, and personnel resources.

Exemplary embodiments of the present invention are described largely in the context of a fully functional computer system for visual data transmission by an air-gapped system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C"programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of visual data transmission by an air-gapped system, the method comprising:
  generating, in response to an error detected during capture of a visual encoding of data by a second computing device via a camera, an alert by the second computing device, wherein the visual encoding of the data was transmitted via a display by an air-gapped system comprising at least one first computing device; and retransmitting, in response to a user input to the air-gapped system, at least a portion of the visual encoding of the data via the display.

2. The method of claim 1, further comprising:

generating, by the second computing device, an instance of the data after completing capture of the visual encoding of the data; and providing the instance of the data to a remote computing device.

3. The method of claim 1, wherein the second computing device comprises a mobile device.

4. The method of claim 1, wherein the user input comprises a keyboard input.

5. The method of claim 1, wherein the at least a portion of the data corresponds to a first offset relative to when the user input was received.

6. The method of claim 5, further comprising retransmitting, in response to another user input to the air-gapped system, another at least a portion of the visual encoding of the data via the display, wherein the other at least a portion of the data corresponds to a second offset relative to when the user input was received, wherein the second offset is greater than the first offset.

7. The method of claim 1, further comprising providing, in response to the user input and a determination that a beginning of the visual encoding of the data would be retransmitted, a recommendation instead of retransmitting the at least a portion of the visual encoding of the data.

8. The method of claim 1, wherein the visual encoding of the data comprises a text encoding.

9. The method of claim 1, wherein the visual encoding of the data comprises quick response (QR) code encoding.

10. The method of claim 1, wherein the alert comprises one or more of: a sound, a visual alert, or a haptic alert.

11. A system for visual data transmission by an air-gapped system, comprising:

an air-gapped system comprising:
    an input device;
    a display; and
    at least one first computing device configured perform first steps comprising:
        transmitting a visual encoding of data via the display; and
        retransmitting, in response to a user input to the input device, at least a portion of the visual encoding of data; and a second computing device comprising a camera, wherein the second computing device is configured to perform second steps comprising:
    detect, during capture of the visual encoding of the data via the camera, an error; and
    generate, in response to the error, an alert.

12. The system of claim 11, wherein the second steps further comprise:

generating an instance of the data after completing capture of the visual encoding of the data; and providing the instance of the data to a remote computing device.

13. The system of claim 11, wherein the second computing device comprises a mobile device.

14. The system of claim 11, wherein the input device comprises a keyboard.

15. The system of claim 11, wherein the at least a portion of the data corresponds to a first offset relative to when the user input was received.

16. The system of claim 15, wherein the first steps further comprise retransmit, in response to another user input to the input device, another at least a portion of the visual encoding of the data via the display, wherein the other at least a portion of the data corresponds to a second offset relative to when the user input was received, wherein the second offset is greater than the first offset.

17. The system of claim 11, wherein the first steps further comprise providing, in response to the user input and a determination that a beginning of the visual encoding of the data would be retransmitted, a recommendation instead of retransmitting the at least a portion of the visual encoding of the data.

18. The system of claim 11, wherein the visual encoding of the data comprises a text encoding.

19. The system of claim 11, wherein the visual encoding of the data comprises quick response (QR) code encoding.

20. The system of claim 11, wherein the alert comprises one or more of: a sound, a visual alert, or a haptic alert.

* * * * *